US012739724B2

(12) United States Patent
Shi

(10) Patent No.: US 12,739,724 B2
(45) Date of Patent: Sep. 15, 2026

(54) HANDLING OF USER EQUIPMENT (UE) CONTEXT INFORMATION AFTER INTER-SYSTEM HANDOVER

(71) Applicant: TELEFONAKTIEBOLAGET LM ERICSSON (PUBL), Stockholm (SE)

(72) Inventor: Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 18/551,478

(22) PCT Filed: Apr. 21, 2022

(86) PCT No.: PCT/SE2022/050387
§ 371 (c)(1),
(2) Date: Sep. 20, 2023

(87) PCT Pub. No.: WO2022/235184
PCT Pub. Date: Nov. 10, 2022

(65) Prior Publication Data

US 2024/0172074 A1 May 23, 2024

Related U.S. Application Data

(60) Provisional application No. 63/184,320, filed on May 5, 2021.

(51) Int. Cl.
*H04W 36/00* (2009.01)
*H04W 36/14* (2009.01)
*H04W 36/30* (2009.01)

(52) U.S. Cl.
CPC ... *H04W 36/305* (2018.08); *H04W 36/00226* (2023.05); *H04W 36/14* (2013.01)

(58) Field of Classification Search
None
See application file for complete search history.

(56) References Cited

U.S. PATENT DOCUMENTS

2022/0141719 A1* 5/2022 Shan ..................... H04W 36/26
370/331

FOREIGN PATENT DOCUMENTS

CN 112584411 A * 3/2021 ............ H04W 24/04
CN 113940105 A * 1/2022 ............ H04W 76/30

OTHER PUBLICATIONS

"Discussion on IMS Voice EPS Fallback", 3GPP TSG-RAN WG3 Meeting #112e, Online Meeting, R3-212329, May 17-27, 2021, pp. 1-2.

(Continued)

*Primary Examiner* — Gerald A Smarth
(74) *Attorney, Agent, or Firm* — Murphy, Bilak & Homiller, PLLC

(57) ABSTRACT

Embodiments include methods for a first network node (e.g., eNB) of a wireless network (e.g., EPS). Such methods include sending (610), to a second network node of the wireless network, a request to retrieve context information associated with a user equipment (UE) that has been or is being handed over from the second network node to the first network node. Such methods include receiving (620) the context information associated with the UE from the second network node. Specifically, the context information includes an indication of whether the UE has an active IP Multimedia System (IMS) voice call that was subject to a first inter-system handover from a 5G System (5GS) to the wireless network. Other embodiments include complementary methods for the second network node, as well as network nodes configured to perform such methods.

20 Claims, 8 Drawing Sheets

(56) References Cited

OTHER PUBLICATIONS

"Introduce the IMS voice EPS tailback from 5G in the Retrieve UE Context procedure", 3GPP TSG-RAN WG3 Meeting #112e, Online, R3-212333, May 17-27, 2021, pp. 1-11.
"RACS Support—S1/NG and X2/Xn", 3GPP TSG-RAN WG3 #107-e, R3-200706, E-meeting, Feb. 24-Mar. 5, 2020, Feb. 24-Mar. 5, 2020, pp. 1-7.
"Returning back to NG-RAN in case of RAT/EPS Fallback", SA WG2 Meeting #126, S2-181884, Montreal, Canada, Feb. 26-Mar. 2, 2018, pp. 1-3.
"Summary of Offline Discussion on 'IMS Voice EPS Fallback and return to 5G'", 3GPP TSG-RAN WG3#111, R3-211058, Online, Jan. 25-Feb. 4, 2021, pp. 1-4.
Latheef, Fasil, et al., "On the UE Context Retrieval Enhancements for Improved Inter-RAT Mobility", 2020, pp. 324-329.

* cited by examiner

HANDLING OF USER EQUIPMENT (UE) CONTEXT INFORMATION AFTER INTER-SYSTEM HANDOVER

TECHNICAL FIELD

Embodiments of the present disclosure generally relate to wireless networks, and particularly relate to improved techniques for handling context information for a user equipment (UE) within a non-5G (e.g., Long-Term Evolution or 4G) network after inter-system handover of the UE from a 5G network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

FIG. 1 shows an exemplary view of an LTE Evolved Packet System (EPS) architecture. E-UTRAN 100 includes one or more evolved Node B's (eNB), such as eNBs 105, 110, and 115, and one or more user equipment (UEs), such as UE 120. In 3GPP terminology, "user equipment" or "UE" refers to any wireless device (e.g., smartphone or computing device) capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 shows exemplary control plane (CP) protocol layers of the radio interface between a UE (210), an eNB (220), and an MME (230) in the EPS. The exemplary protocol layers includes Physical (PHY), Medium Access Control (MAC), Radio Link Control (RLC), Packet Data Convergence Protocol (PDCP), and Radio Resource Control (RRC) layers between the UE and an eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol layers also includes non-access stratum (NAS) signaling between the UE and an MME in the EPC.

The RRC layer controls communications between UE and eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The fifth generation ("5G") of cellular systems, also referred to as New Radio (NR), is being standardized within 3GPP. NR is developed to support a variety of different use cases. These include enhanced mobile broadband (eMBB), machine type communications (MTC), ultra-reliable low latency communications (URLLC), and several other use cases.

5G/NR technology shares many similarities with fourth-generation LTE. For example, the 5G system (5GS) architecture is based on a Next Generation RAN (NG-RAN) and a 5G Core (5GC), much like the LTE EPS is based on E-UTRAN and EPC. Additionally, the NR RRC layer includes RRC_IDLE and RRC_CONNECTED states, but adds another state called RRC_INACTIVE. In addition to providing coverage via "cells," as in LTE, NR networks also provide coverage via "beams." In general, a DL "beam" is a coverage area of a network-transmitted reference signal (RS) that may be measured or monitored by a UE.

Historically, UEs provided voice services over a circuit-switched (CS) telephone network. In packet-switched networks, data packets are routed based on protocols specified by the Internet Engineering Task Force (IETF), such as Internet Protocol (IP), User Datagram Protocol (UDP), etc. IP Multimedia Subsystem (IMS) is an architectural framework used to deliver multimedia services to UEs based on these Internet-centric protocols. IMS was originally specified in 3GPP Rel-5 as a technology for evolving mobile networks beyond GSM, e.g., for delivering Internet services over GPRS. IMS has expanded in subsequent releases to support other access networks and a wide range of services and applications.

SUMMARY

Even so, voice remains an important IMS application. When an IMS voice call is received in an NG-RAN node, it may trigger an IMS fallback to the EPS (e.g., via inter-system handover) if the NG-RAN node does not support IMS voice. In 3GPP Rel-15, it was agreed that the "IMS voice EPS fallback from 5G" is supported on the S1-AP interface in the EPS.

In case of inter-system UE handover from 5GS to EPS, it is beneficial for a target eNB in the E-UTRAN to know the reason for the handover. For example, when an IMS voice call is terminated, the target eNB can take actions to facilitate improved end-to-end user experience, such as handing the UE back to 5GS when appropriate. However, there are some scenarios when this may not be possible due to loss of the knowledge within EPS about the original inter-system handover of the UE from 5GS to EPS. This can cause various problems, issues, and/or difficulties.

Embodiments of the present disclosure provide specific improvements to communication between UEs and network nodes in a wireless network, such as by facilitating solutions to overcome exemplary problems summarized above and described in more detail below.

Some embodiments of the present disclosure include methods (e.g., procedures) for a first network node (e.g., base station, eNB, ng-eNB, etc. or component thereof) of a wireless network.

These exemplary methods can include sending, to a second network node of the wireless network, a request to retrieve context information associated with a UE that has been or is being handed over from the second network node to the first network node. These exemplary methods can also include receiving the context information associated with the UE from the second network node. The context information includes an indication of whether the UE has an active IMS voice call that was subject to a first inter-system handover from a 5GS to the wireless network.

In some embodiments, these exemplary methods can also include, based on the received context information, establishing a connection with the UE to carry the active IMS voice call. In some embodiments, the received context information also indicates a radio access bearer (RAB) used for the active IMS voice call.

In some embodiments, these exemplary methods can also include storing the received context information, including the indication, and performing one or more actions towards the UE based on the stored indication. In some of these embodiments, performing one or more actions can include the following: when the indication indicates that the UE has an active IMS voice call that was subject to the first inter-system handover from the 5GS, determining whether the 5GS is available; and based on determining that the 5GS is available, performing a second inter-system handover of the UE from the wireless network to the 5GS.

In some of these embodiments, performing one or more actions can also include, when the indication indicates that the UE has an active IMS voice call that was subject to the first inter-system handover from the 5GS, detecting one of the following conditions: end of the active IMS voice call, or a reduced QoS for the active IMS voice call. In such embodiments, determining whether the 5GS is available is responsive to detecting one of the conditions.

In some embodiments, the wireless network is an EPS, the first and second network nodes are eNBs, and the indication indicates an IMS voice fallback from 5GS to EPS. In some of these embodiments, the request comprises a RETRIEVE UE CONTEXT REQUEST message and the context information is received in a UE Context Information information element (IE) of a RETRIEVE UE CONTEXT RESPONSE message.

Other embodiments include methods (e.g., procedures) for a second network node (e.g., base station, eNB, ng-eNB, etc., or component thereof) of a wireless network.

These exemplary methods can include receiving, from a first network node of the wireless network, a request to retrieve context information associated with a UE that has been or is being handed over from the second network node to the first network node. These exemplary methods can also include sending the context information associated with the UE to the first network node. The context information includes an indication of whether the UE has an active IMS voice call that was subject to a first inter-system handover from a 5GS to the wireless network.

In some embodiments, these exemplary methods can also include performing the first inter-system handover of the UE from a network node of the 5GS and setting the indication included in the context information according to whether the UE has an active IMS voice call during the first inter-system handover.

In some embodiments, the received context information also indicates a RAB used for the active IMS voice call. In some embodiments, the wireless network is an EPS, the first and second network nodes are eNBs, and the indication indicates an IMS voice fallback from 5GS to EPS. In some of these embodiments, the request comprises a RETRIEVE UE CONTEXT REQUEST message and the context information is received in a UE Context Information IE of a RETRIEVE UE CONTEXT RESPONSE message.

Other embodiments include network nodes (e.g., base stations, eNBs, ng-eNBs, etc., or components thereof) configured to perform operations corresponding to any of the exemplary methods described herein. Other embodiments include non-transitory, computer-readable media storing program instructions that, when executed by processing circuitry, configure such network nodes to perform operations corresponding to any of the exemplary methods described herein.

These and other embodiments can facilitate consistent handling of UEs after inter-system handover from 5GS to EPS, even after radio link failure (RLF) and subsequent connection reestablishment. This can lead to improved UE inter-system mobility, more consistent delivery of network services to UEs, and improved end-user experience.

These and other objects, features, and advantages of embodiments of the present disclosure will become apparent upon reading the following Detailed Description in view of the Drawings briefly described below.

DETAILED DESCRIPTION

Figure 1:
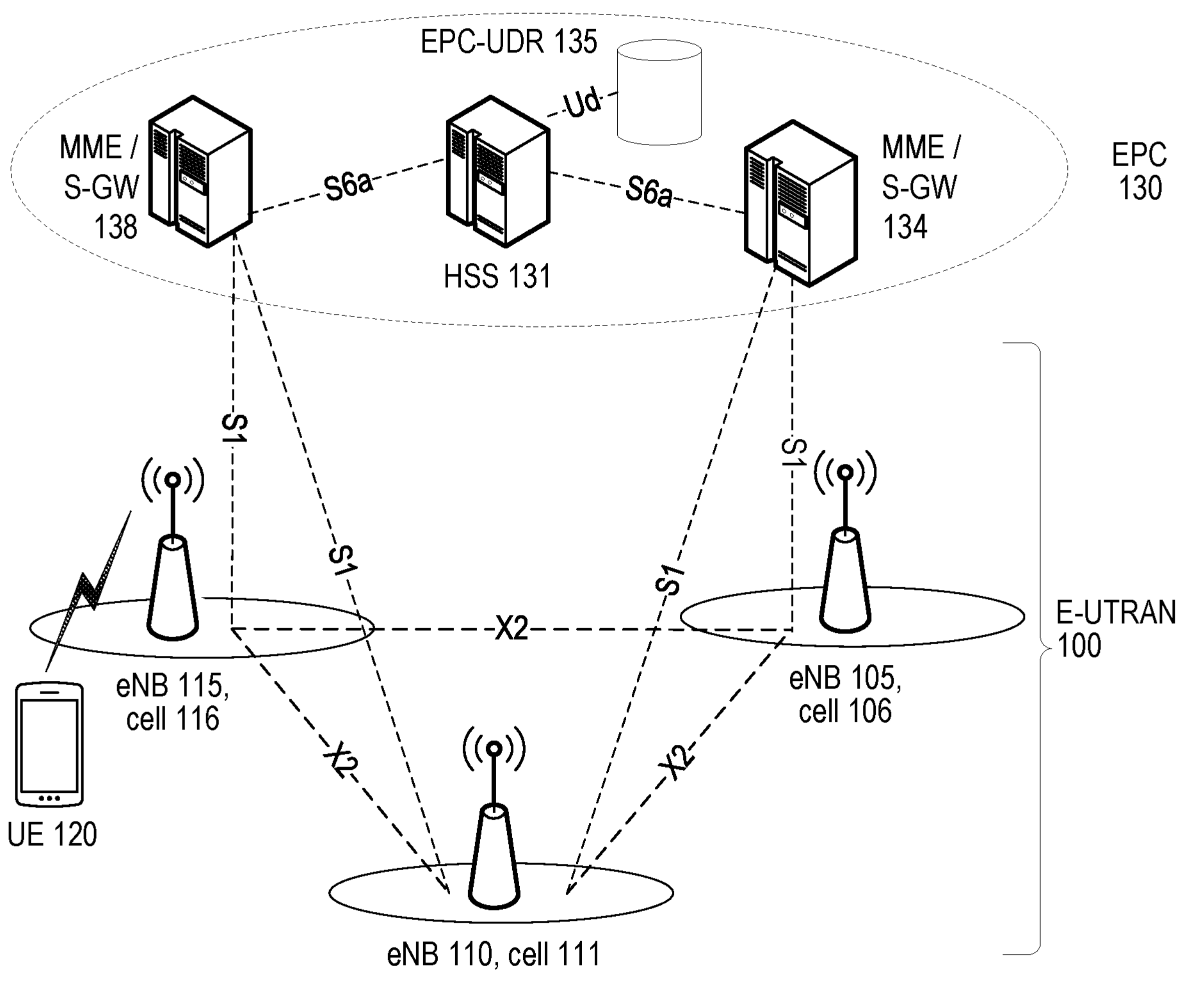
FIG. 1 shows an exemplary view of an LTE Evolved Packet System (EPS) architecture.
Figure 2:
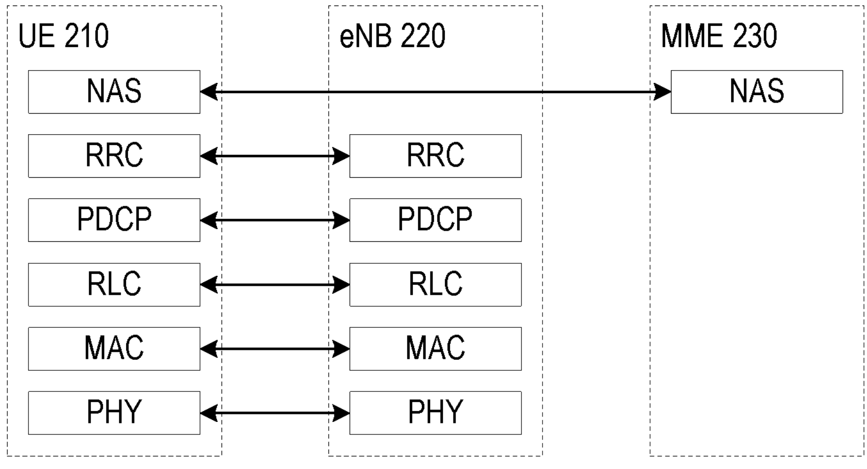
FIG. 2 shows exemplary control plane protocol layers of the radio interface between a UE and the LTE EPS.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objects, features, and advantages of the disclosed embodiments will become apparent from the following description.

Furthermore, the following terms are used throughout the description given below:

- Radio Node: As used herein, a "radio node" can be either a "radio access node" or a "wireless device."
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IOT) devices, vehicle-mounted wireless terminal devices, etc.
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, it is beneficial for a target eNB in the E-UTRAN to know the reason for an inter-system handover of a UE from 5GS to EPS, e.g., due to termination of an IMS voice call in 5GS, such that the target eNB can take actions to improve end-user experience. However, there are some scenarios when this may not be possible due to loss of the knowledge within EPS about the original inter-system handover of the UE from 5GS to EPS. These issues are discussed in more detail after the following introduction to 5GS network 25 architecture.

Figure 3:
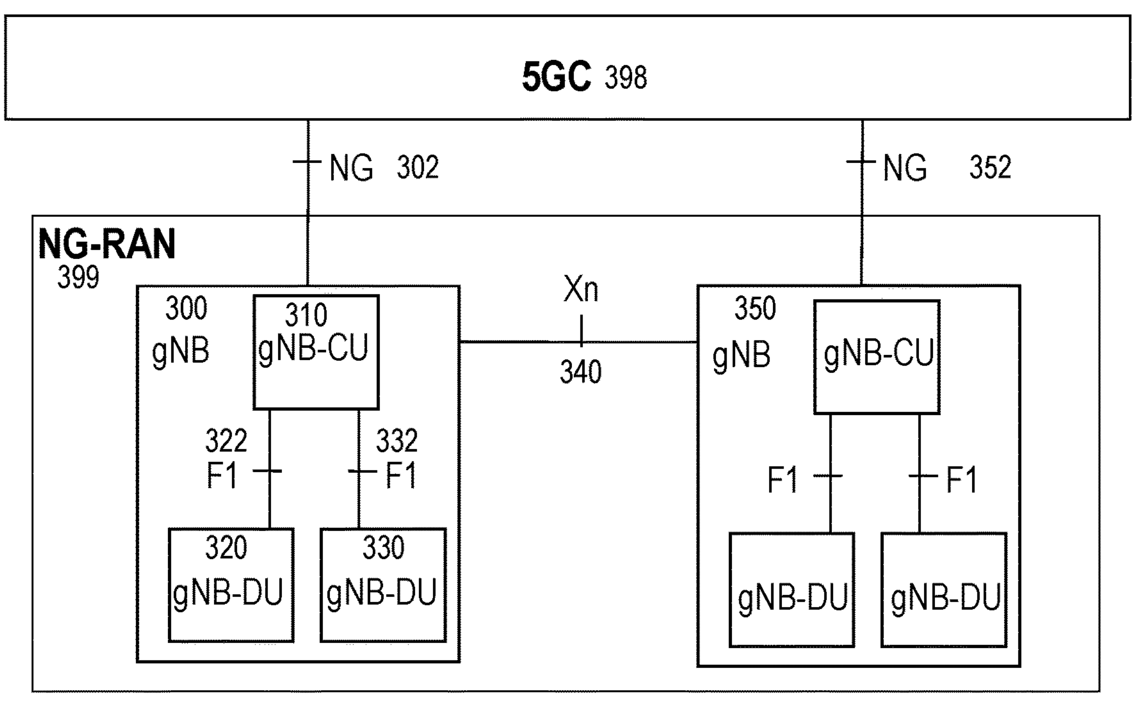
FIGS. 3-4 show two exemplary views of a 5G system (5GS) architecture.

FIG. 3 illustrates a high-level view of an exemplary 5GS architecture, consisting of a Next Generation RAN (NG-RAN 399) and a 5G Core (5GC 398). NG-RAN 399 can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. Each of the gNBs can support frequency division duplexing (FDD), time division duplexing (TDD), or a combination thereof on the NR interface to UEs.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for control plane (CP) and user plane (UP) data on TNL of NG-RAN interfaces is supported, NDS/IP (3GPP TS 33.401) shall be applied.

The NG RAN logical nodes shown in FIG. 3 include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
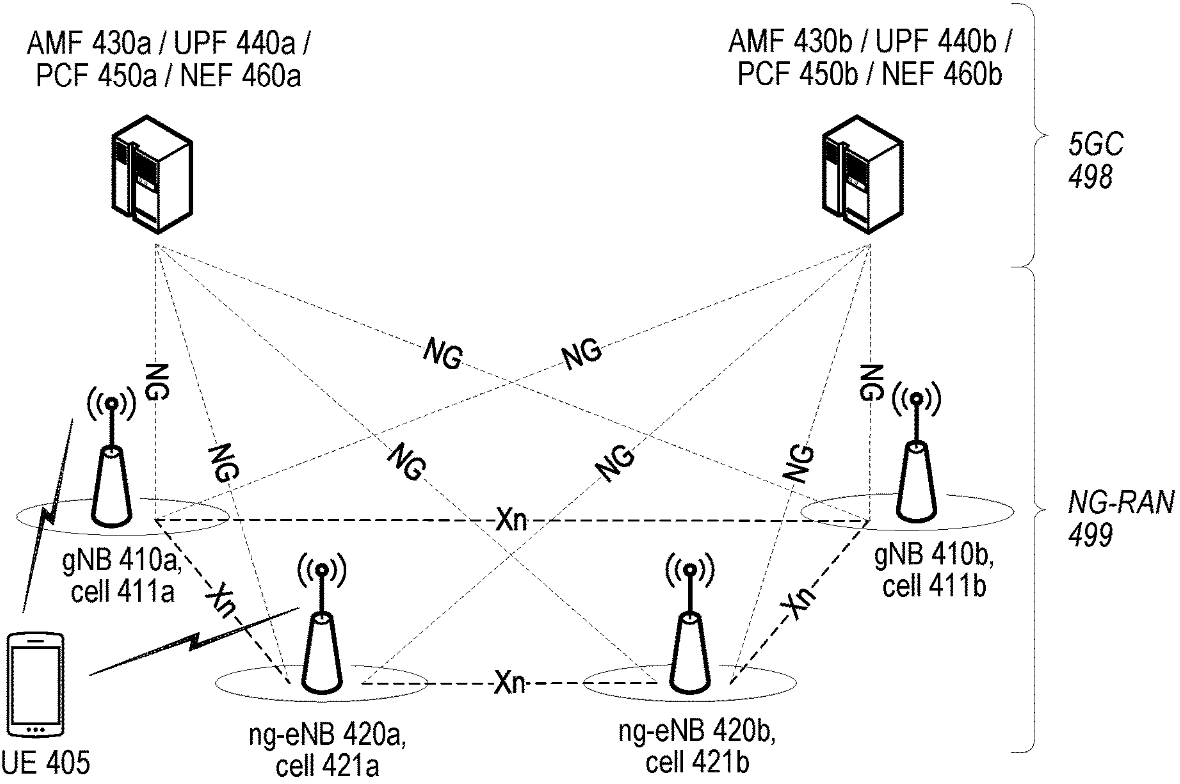

FIG. 4 shows another high-level view of an exemplary 5G network architecture, including NG-RAN 499 and 5GC 498. As shown in the figure, NG-RAN 499 can include gNBs (e.g., 410*a,b*) and ng-eNBs (e.g., 420*a,b*) that are interconnected via respective Xn interfaces. The gNBs and ng-eNBs are also connected via the NG interfaces to 5GC 498, more specifically to the access and mobility management functions (AMFs, e.g., 430*a,b*) via respective NG-C interfaces and to the user plane functions (UPFs, e.g., 440*a,b*) via respective NG-U interfaces. Moreover, the AMFs can communicate with one or more policy control functions (PCFs, e.g., 450*a,b*) and network exposure functions (NEFs, e.g., 460*a,b*).

Each of the gNBs support the NR radio interface including FDD, TDD, or a combination thereof. Each of ng-eNBs support the LTE radio interface but unlike conventional LTE eNBs (e.g., in FIG. 1), they connect to the 5GC via the NG interface. Each gNB or ng-eNB can serve a geographic coverage area including one more cells, such as cells 411*a-b* and 421*a-b* shown in FIG. 4. Depending on the cell in which it is located, a UE 405 can communicate with the gNB or ng-eNB serving that cell via the NR or LTE radio interface, respectively. Although FIG. 4 shows gNBs and ng-eNBs as separate entities, it is possible that a single NG-RAN node can have gNB and ng-eNB functionalities.

In some embodiments, gNBs and ng-eNBs can also use various directional beams to provide coverage in the respective cells. In general, a DL "beam" is a coverage area of a network-transmitted reference signal (RS) that may be measured or monitored by a UE. In NR, for example, such RS can include any of the following, alone or in combination: synchronization signal/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

When an IMS voice call is received in an NG-RAN node, it may trigger an IMS fallback to the EPS (e.g., via inter-system handover) if the NG-RAN node does not support IMS voice. It is beneficial for the handover target eNB in the E-UTRAN to know the reason for the inter-system handover (e.g., "IMS voice EPS fallback from 5G") so that it can take actions to facilitate improved end-to-end user experience, such as handing the UE back to 5GS when appropriate.

However, the target eNB (also referred to as "old eNB") for the original inter-system handover may not be able to handover the UE back to 5GS. For example, if the UE experiences a radio link failure (RLF) or similar condition when operating in a cell served by the target eNB, the UE needs to re-establish its connection with a new cell, which may be served by a different eNB in the E-UTRAN (also referred to as "new eNB"). In such case, the new eNB retrieves the UE's context from the old eNB and uses this information to reestablish the UE's E-UTRAN radio access bearers (E-RABs).

Figure 5:
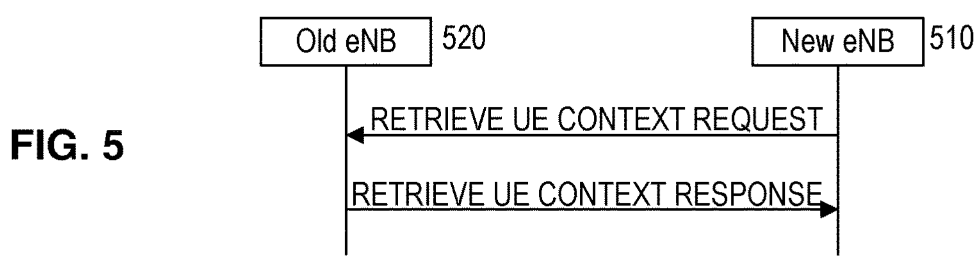
FIG. 5 shows an exemplary procedure for retrieval of a UE context by an evolved NodeB (eNB).

FIG. 5 shows an exemplary procedure used by the new eNB (510) to retrieve the UE context from the old eNB (520). In particular, the new eNB sends a RETRIEVE UE CONTEXT REQUEST message to the old eNB, which responds with a RETRIEVE UE CONTEXT RESPONSE message. These messages can be exchanged over an X2 interface between the two eNBs, as further defined in 3GPP TS 36.423 (v16.5.0).

With respect to the scenario discussed above, one problem is that the old eNB does not provide the new eNB with any information about the UE's previous inter-system handover from 5GS to 4GS. Accordingly, the new eNB is not aware that it should take actions such as handing the UE back to 5GS when appropriate.

Embodiments of the present disclosure can address these and other issues, problems, and/or difficulties by introducing an indication that the "UE is handed over from 5G to 4G due to IMS fallback" (or similar name) in the UE context retrieve procedure, e.g., exemplified in FIG. 5. A new eNB (e.g., an eNB in which the UE has reestablished its connection after RLF) stores this information and uses it to take actions towards the UE that are preferable and/or necessary to improve quality-of-service (QOS) and/or end-user experience, such as handing the UE back to 5GS when appropriate.

Embodiments disclosed herein can provide various advantages, benefits, and/or solutions to problems. For example, embodiments provide a consistent handling of UEs after an inter-system handover from 5GS to EPS, even after RLF and subsequent connection reestablishment. This leads to improved UE inter-system mobility and, consequently, more consistent delivery of network services to UEs and improved end-user experience.

In some embodiments, an indication that a UE has been handed over from 5GS to EPS via inter-system handover can be a field in a UE Context Information information element (IE) that is included in the RETRIEVE UE CONTEXT RESPONSE message of the exemplary procedure shown in FIG. 5. The following proposed text for 3GPP TS 36.423 defines a UE Context Information IE that includes such a field, called "IMS voice EPS fallback from 5G". Note that the proposed text is not intended to be complete and may omit certain aspects that are not essential to explanation and/or understanding of these embodiments.

* Begin Proposed 3GPP TS 36.423 Text *

9.1.2.29 Retrieve Ue Context Response

This message is sent by the old eNB to transfer the UE context to the new eNB.

Direction: Old eNB→New eNB.

| IE/Group Name | Pres. | Range | IE type/ref. | Semantics description | Criticality | Assigned Criticality |
|---|---|---|---|---|---|---|
| Message Type | M | | 9.2.13 | | YES | ignore |
| New eNB UE X2AP ID | M | | eNB UE X2AP ID 9.2.24 | Allocated at the new eNB | YES | ignore |
| New eNB UE X2AP ID Extension | O | | Extended eNB UE X2AP ID 9.2.86 | Allocated at the new eNB | YES | ignore |
| Old eNB UE X2AP ID | M | | eNB UE X2AP ID 9.2.24 | Allocated at the old eNB | YES | ignore |
| Old eNB UE X2AP ID Extension | O | | Extended eNB UE X2AP ID 9.2.86 | Allocated at the old eNB | YES | ignore |
| GUMMEI | M | | 9.2.16 | | YES | reject |
| UE Context Information | | 1 | | | YES | reject |
| >MME UE S1AP ID | M | | INTEGER (0 . . . $2^{32}$ − 1) | MME UE S1AP ID allocated at the MME | — | |
| >UE Security Capabilities | M | | 9.2.29 | | — | |
| >AS Security Information | M | | 9.2.30 | | — | |
| >UE Aggregate Maximum Bit Rate | M | | 9.2.12 | | — | |
| >Subscriber Profile ID for RAT/Frequency priority | O | | 9.2.25 | | — | |
| >E-RABs To Be Setup List | | 1 | | | — | |
| >>E-RABs To Be Setup Item | | 1 . . . <maxno-ofBearers> | | | EACH | ignore |
| >>>E-RAB ID | M | | 9.2.23 | | — | |
| >>>E-RAB Level QOS Parameters | M | | 9.2.9 | Includes necessary QoS parameters | — | |
| >>>Bearer Type | O | | 9.2.92 | | — | |
| >>>UL GTP Tunnel Endpoint | M | | GTP Tunnel Endpoint 9.2.1 | SGW endpoint of the S1 transport bearer. For delivery of UL PDUs. | YES | reject |
| >>>DL Forwarding | O | | 9.2.5 | | YES | ignore |
| >>>Ethernet Type | O | | 9.2.157 | | YES | ignore |
| >RRC Context | M | | OCTET STRING | Includes the message defined in either subclause | — | |

-continued

| IE/Group Name | Pres. | Range | IE type/ref. | Semantics description | Criticality | Assigned Criticality |
|---|---|---|---|---|---|---|
| | | | | 10.2.2 or 10.6.2 of TS 36.331. | | |
| >Handover Restriction List | O | | 9.2.3 | | — | |
| >Location Reporting Information | O | | 9.2.21 | Includes the necessary parameters for location reporting | — | |
| >Management Based MDT Allowed | O | | 9.2.59 | | — | |
| >Management Based MDT PLMN List | O | | MDT PLMN List 9.2.64 | | — | |
| >UE Sidelink Aggregate Maximum Bit Rate | O | | 9.2.97 | This IE applies only if the UE is authorized for V2X services. | YES | ignore |
| >Additional RRM Policy Index | O | | 9.2.25a | | YES | ignore |
| >EPC Handover Restriction List Container | O | | 9.2.153 | | YES | ignore |
| > IMS voice EPS fallback from 5G | O | | ENUMERATED (true, . . .) | | YES | reject |
| Trace Activation | O | | 9.2.2 | | YES | ignore |
| SRVCC Operation Possible | O | | 9.2.33 | | YES | ignore |
| Masked IMEISV | O | | 9.2.69 | | YES | ignore |
| Expected UE Behaviour | O | | 9.2.70 | | YES | ignore |
| ProSe Authorized | O | | 9.2.78 | | YES | ignore |
| Criticality Diagnostics | O | | 9.2.7 | | YES | ignore |
| V2X Services Authorized | O | | 9.2.93 | | YES | ignore |
| Aerial UE subscription information | O | | 9.2.129 | | YES | ignore |
| Subscription Based UE Differentiation Information | O | | 9.2.136 | | YES | ignore |

* End Proposed 3GPP TS 36.423 Text *

Note that the name of the indication and its location within the exemplary UE Context Information IE above are merely exemplary, such that the indication can be given a different name and placed at different location within the IE. Additionally, the indication can be included in a different IE in the same RETRIEVE UE CONTEXT RESPONSE message, or in a different message as appropriate.

When the new eNB receives a UE Context Information IE that includes this field, it will store the indication in the UE context together with other information and use it as appropriate. For example, when the UE's IMS voice service that caused the handover is terminated on EPS, the new eNB can send the UE back to 5GS.

The embodiments described above can be further illustrated with reference to FIGS. 6-7, which depict exemplary methods (e.g., procedures) for a first network node and a second network node, respectively. Put differently, various features of the operations described below correspond to various embodiments described above. For example, the first network node can correspond to the "new eNB" discussed above and the second network node can correspond to the "old eNB" discussed above.

Figure 6:
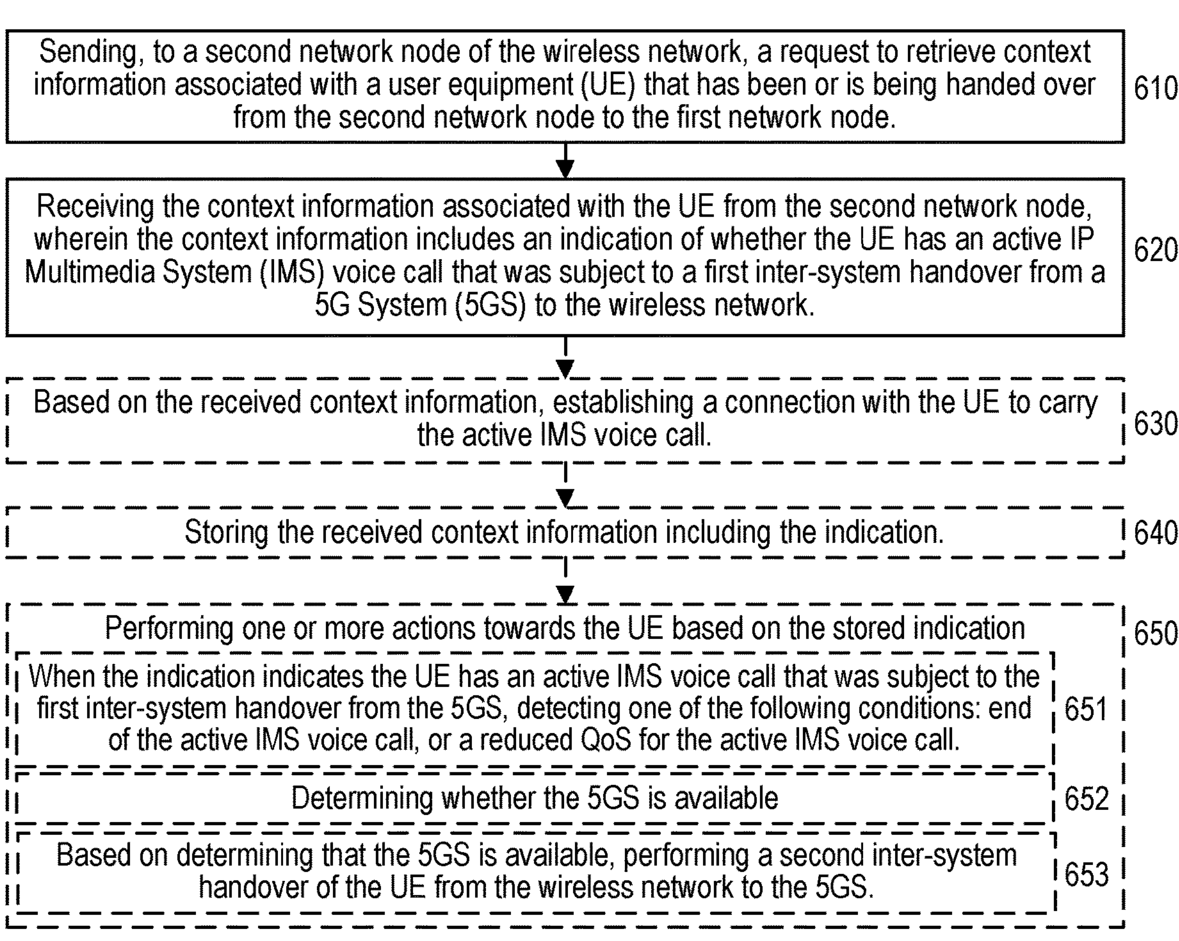
FIG. 6 shows a flow diagram of an exemplary method (e.g., procedure) for a first network node (e.g., eNB), according to various embodiments of the present disclosure.
Figure 7:
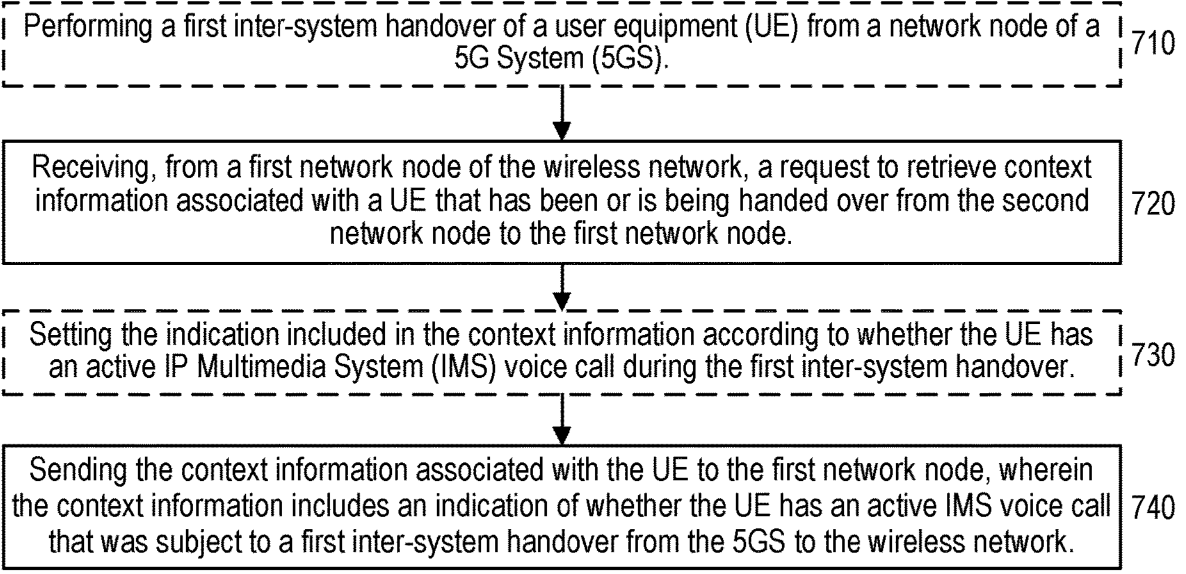
FIG. 7 shows a flow diagram of an exemplary method (e.g., procedure) for a second network node (e.g., eNB), according to various embodiments of the present disclosure.

The exemplary methods shown in FIGS. 6-7 can be used cooperatively to provide various exemplary benefits and solve various exemplary problems, including those described herein. Although FIGS. 6-7 show specific blocks in particular orders, the operations of the exemplary methods can be performed in different orders than shown and can be combined and/or divided into blocks having different functionality than shown. Optional blocks or operations are indicated by dashed lines.

More specifically, FIG. 6 shows a flow diagram of an exemplary method (e.g., procedure) for a first network node of a wireless network, according to various embodiments of the present disclosure. The exemplary method can be performed by a network node (e.g., base station, eNB, ng-eNB, etc. or component thereof) such as described elsewhere herein.

The exemplary method can include the operations of block 610, where the first network node can send, to a second network node of the wireless network, a request to retrieve context information associated with a UE that has been or is being handed over from the second network node to the first network node. The exemplary method can also include the operations of block 620, where the first network node can receive the context information associated with the UE from the second network node. The context information includes an indication of whether the UE has an active IMS voice call that was subject to a first inter-system handover from a 5GS to the wireless network.

In some embodiments, the exemplary method can also include the operations of block 630, where based on the received context information, the first network node can establish a connection with the UE to carry the active IMS voice call. In some embodiments, the received context information also indicates a radio access bearer (RAB) used for the active IMS voice call. For example, the connection established in block 630 can include the RAB indicated in the received context information.

In some embodiments, the exemplary method can also include the operations of blocks 640-650, where the first network node can store the received context information, including the indication, and perform one or more actions towards the UE based on the stored indication. In some of these embodiments, performing one or more actions in block 650 can include the operations of sub-blocks 652-653. In sub-block 652, when the indication indicates that the UE has an active IMS voice call that was subject to the first inter-system handover from the 5GS, the first network node can determine whether the 5GS is available. In sub-block 653, based on determining that the 5GS is available, the first network node can perform a second inter-system handover of the UE from the wireless network to the 5GS.

In some of these embodiments, performing one or more actions in block 650 can also include the operations of sub-block 651, where when the indication indicates that the UE has an active IMS voice call that was subject to the first inter-system handover from the 5GS, the first network node can detect one of the following conditions: end of the active IMS voice call, or a reduced QoS for the active IMS voice call. In such embodiments, determining whether the 5GS is available in sub-block 652 is responsive to detecting one of the conditions in sub-block 651.

In some embodiments, the wireless network is an EPS and the first and second network nodes are eNBs. In such embodiments, the indication indicates an IMS voice fallback from 5GS to EPS. The exemplary 3GPP specification text above provides an example of these embodiments. In some of these embodiments, the request comprises a RETRIEVE UE CONTEXT REQUEST message and the context information is received in a UE Context Information IE of a RETRIEVE UE CONTEXT RESPONSE message. An example of these embodiments was discussed above.

In addition, FIG. 7 shows a flow diagram of an exemplary method (e.g., procedure) for a second network node of a wireless network, according to various embodiments of the present disclosure. The exemplary method can be performed by a network node (e.g., base station, eNB, gNB, ng-eNB, etc., or component thereof) such as described elsewhere herein.

The exemplary method can include the operations of block 720, where the second network node can receive, from a first network node of the wireless network, a request to retrieve context information associated with a UE that has been or is being handed over from the second network node to the first network node. The exemplary method can also include the operations of block 740, where the second network node can send the context information associated with the UE to the first network node. The context information includes an indication of whether the UE has an active IMS voice call that was subject to a first inter-system handover from a 5GS to the wireless network.

In some embodiments, the exemplary method can also include the operations of blocks 710 and 730, where the second network node can perform the first inter-system handover of the UE from a network node of the 5GS and set the indication included in the context information (e.g., sent in block 740) according to whether the UE has an active IMS voice call during the first inter-system handover.

In some embodiments, the received context information also indicates a RAB used for the active IMS voice call. In some embodiments, the wireless network is an EPS and the first and second network nodes are eNBs. In such embodiments, the indication indicates an IMS voice fallback from 5GS to EPS. The exemplary 3GPP specification text above provides an example of these embodiments. In some of these embodiments, the request comprises a RETRIEVE UE CONTEXT REQUEST message and the context information is received in a UE Context Information IE of a RETRIEVE UE CONTEXT RESPONSE message. An example of these embodiments was discussed above.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 8:
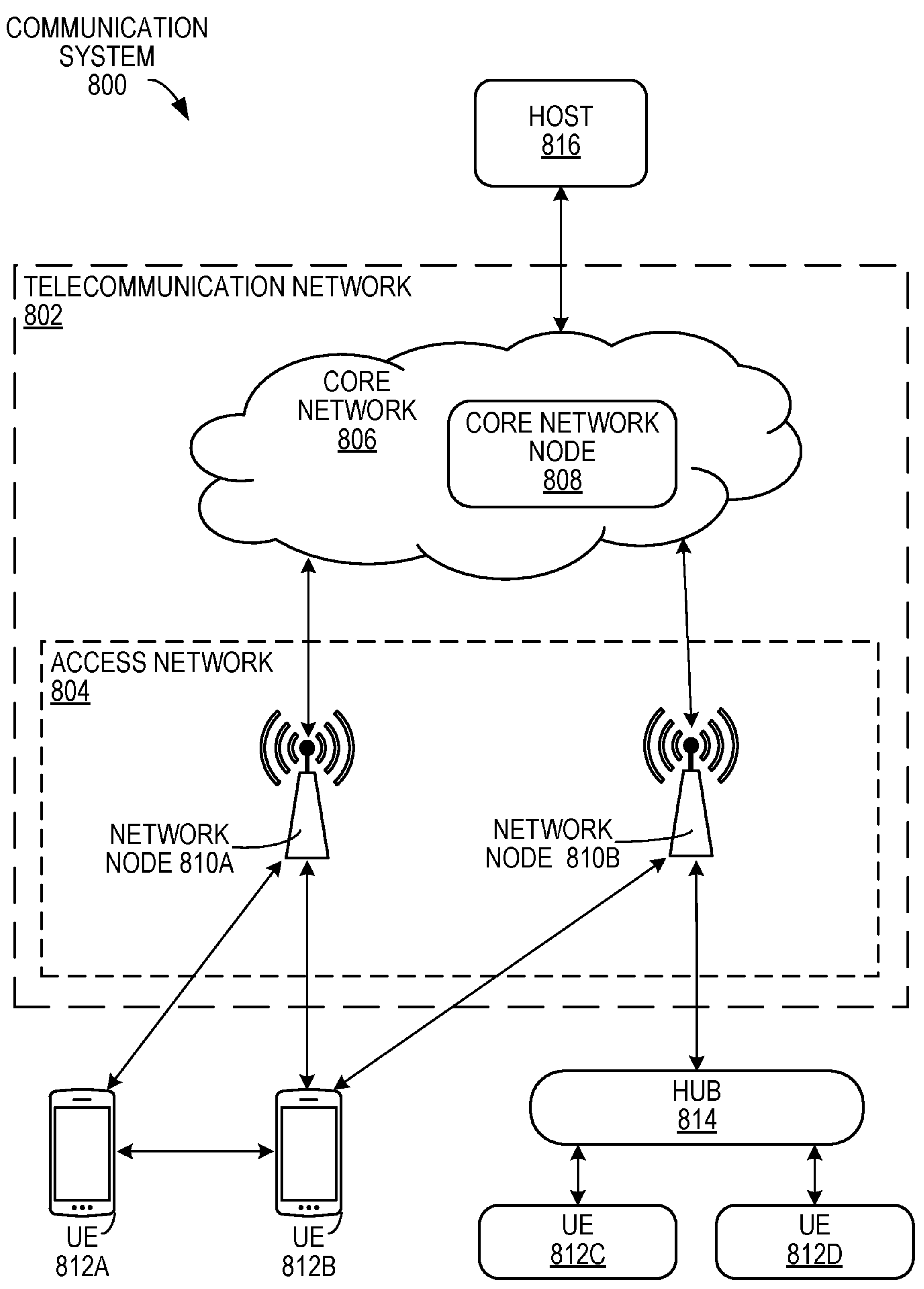
FIG. 8 shows a communication system according to various embodiments of the present disclosure.

FIG. 8 shows an example of a communication system 800 in accordance with some embodiments. In this example, the communication system 800 includes a telecommunication network 802 that includes an access network 804, such as a radio access network (RAN), and a core network 806, which includes one or more core network nodes 808. The access network 804 includes one or more access network nodes, such as network nodes 810*a* and 810*b* (one or more of which may be generally referred to as network nodes 810), or any other similar 3$^{rd}$ Generation Partnership Project (3GPP) access node or non-3GPP access point. The network nodes 810 facilitate direct or indirect connection of user equipment (UE), such as by connecting UEs 812*a*, 812*b*, 812*c*, and 812*d* (one or more of which may be generally referred to as UEs 812) to the core network 806 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 800 may include any number of wired or wireless networks, network nodes, UEs, and/or any other components or systems that may facilitate or participate in the communication of data and/or signals whether via wired or wireless connections. The communication system 800 may include and/or interface with any type of communication, telecommunication, data, cellular, radio network, and/or other similar type of system.

The UEs 812 may be any of a wide variety of communication devices, including wireless devices arranged, configured, and/or operable to communicate wirelessly with the network nodes 810 and other communication devices. Similarly, the network nodes 810 are arranged, capable, configured, and/or operable to communicate directly or indirectly with the UEs 812 and/or with other network nodes or equipment in the telecommunication network 802 to enable and/or provide network access, such as wireless network access, and/or to perform other functions, such as administration in the telecommunication network 802.

In the depicted example, the core network 806 connects the network nodes 810 to one or more hosts, such as host 816. These connections may be direct or indirect via one or more intermediary networks or devices. In other examples, network nodes may be directly coupled to hosts. The core network 806 includes one more core network nodes (e.g., core network node 808) that are structured with hardware and software components. Features of these components may be substantially similar to those described with respect to the UEs, network nodes, and/or hosts, such that the descriptions thereof are generally applicable to the corresponding components of the core network node 808. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 816 may be under the ownership or control of a service provider other than an operator or provider of the access network 804 and/or the telecommunication network 802 and may be operated by the service provider or on behalf of the service provider. The host 816 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 800 of FIG. 8 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 802 is a cellular network that implements 3GPP standardized features. Accordingly, the telecommunications network 802 may support network slicing to provide different logical networks to different devices that are connected to the telecommunication network 802. For example, the telecommunications network 802 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 812 are configured to transmit and/or receive information without direct human interaction. For instance, a UE may be designed to transmit information to the access network 804 on a predetermined schedule, when triggered by an internal or external event, or in response to requests from the access network 804. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 814 communicates with the access network 804 to facilitate indirect communication between one or more UEs (e.g., UE 812*c* and/or 812*d*) and network nodes (e.g., network node 810*b*). In some examples, the hub 814 may be a controller, router, content source and analytics, or any of the other communication devices described herein regarding UEs. For example, the hub 814 may be a broadband router enabling access to the core network 806 for the UEs. As another example, the hub 814 may be a controller that sends commands or instructions to one or more actuators in the UEs. Commands or instructions may be received from the UEs, network nodes 810, or by executable code, script, process, or other instructions in the hub 814. As another example, the hub 814 may be a data collector that acts as temporary storage for UE data and, in some embodiments, may perform analysis or other processing of the data. As another example, the hub 814 may be a content source. For example, for a UE that is a VR headset, display, loudspeaker or other media delivery device, the hub 814 may retrieve VR assets, video, audio, or other media or data related to sensory information via a network node, which the hub 814 then provides to the UE either directly, after performing local processing, and/or after adding additional local content. In still another example, the hub 814 acts as a proxy server or orchestrator for the UEs, in particular in if one or more of the UEs are low energy IoT devices.

The hub 814 may have a constant/persistent or intermittent connection to the network node 810*b*. The hub 814 may also allow for a different communication scheme and/or schedule between the hub 814 and UEs (e.g., UE 812*c* and/or 812*d*), and between the hub 814 and the core network 806. In other examples, the hub 814 is connected to the core network 806 and/or one or more UEs via a wired connection. Moreover, the hub 814 may be configured to connect to an M2M service provider over the access network 804 and/or to another UE over a direct connection. In some scenarios, UEs may establish a wireless connection with the network nodes 810 while still connected via the hub 814 via a wired or wireless connection. In some embodiments, the hub 814 may be a dedicated hub—that is, a hub whose primary function is to route communications to/from the UEs from/to the network node 810*b*. In other embodiments, the hub 814 may be a non-dedicated hub—that is, a device which is capable of operating to route communications between the UEs and network node 810*b*, but which is additionally capable of operating as a communication start and/or end point for certain data channels.

Figure 9:
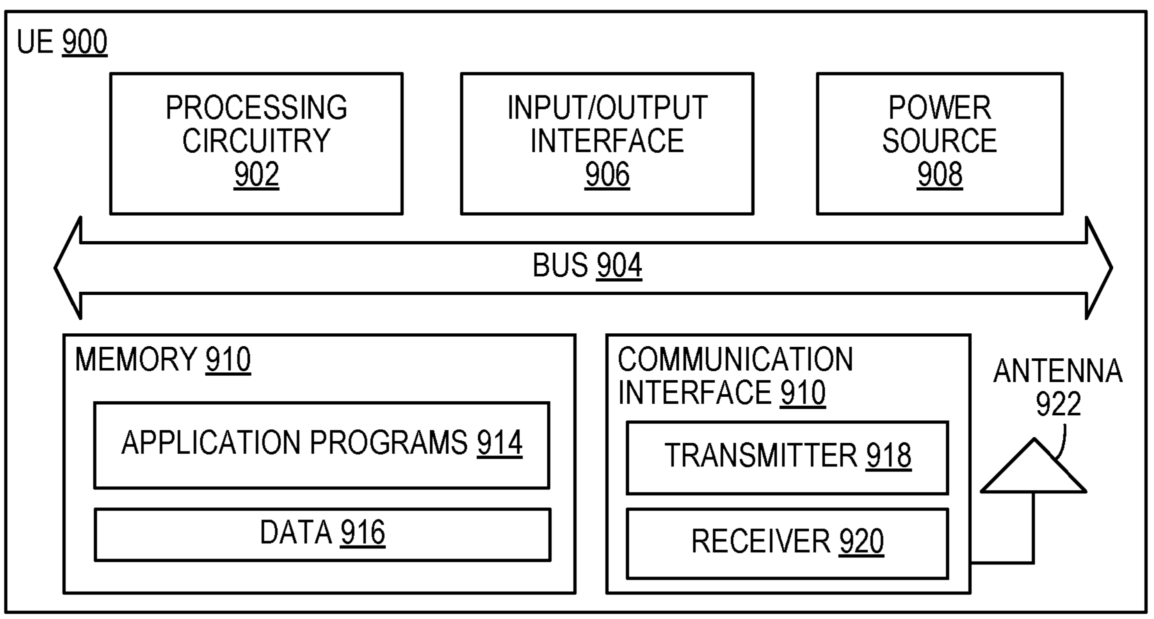
FIG. 9 shows a UE according to various embodiments of the present disclosure.

FIG. 9 shows a UE 900 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB- IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 900 includes processing circuitry 902 that is operatively coupled via a bus 904 to an input/output interface 906, a power source 908, a memory 910, a communication interface 912, and/or any other component, or any combination thereof. Certain UEs may utilize all or a subset of the components shown in FIG. 9. The level of integration between the components may vary from one UE to another UE. Further, certain UEs may contain multiple instances of a component, such as multiple processors, memories, transceivers, transmitters, receivers, etc.

The processing circuitry 902 is configured to process instructions and data and may be configured to implement any sequential state machine operative to execute instructions stored as machine-readable computer programs in the memory 910. The processing circuitry 902 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 902 may include multiple central processing units (CPUs).

In the example, the input/output interface 906 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 900. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 908 is structured as a battery or battery pack. Other types of power sources, such as an external power source (e.g., an electricity outlet), photovoltaic device, or power cell, may be used. The power source 908 may further include power circuitry for delivering power from the power source 908 itself, and/or an external power source, to the various parts of the UE 900 via input circuitry or an interface such as an electrical power cable. Delivering power may be, for example, for charging of the power source 908. Power circuitry may perform any formatting, converting, or other modification to the power from the power source 908 to make the power suitable for the respective components of the UE 900 to which power is supplied.

The memory 910 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 910 includes one or more application programs 914, such as an operating system, web browser application, a widget, gadget engine, or other application, and corresponding data 916. The memory 910 may store, for use by the UE 900, any of a variety of various operating systems or combinations of operating systems.

The memory 910 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 910 may allow the UE 900 to access instructions, application programs and the like, stored on transitory or non-transitory memory media, to off-load data, or to upload data. An article of manufacture, such as one utilizing a communication system may be tangibly embodied as or in the memory 910, which may be or comprise a device-readable storage medium.

The processing circuitry 902 may be configured to communicate with an access network or other network using the communication interface 912. The communication interface 912 may comprise one or more communication subsystems and may include or be communicatively coupled to an antenna 922. The communication interface 912 may include one or more transceivers used to communicate, such as by communicating with one or more remote transceivers of another device capable of wireless communication (e.g., another UE or a network node in an access network). Each transceiver may include a transmitter 918 and/or a receiver 920 appropriate to provide network communications (e.g., optical, electrical, frequency allocations, and so forth). Moreover, the transmitter 918 and receiver 920 may be coupled to one or more antennas (e.g., antenna 922) and may share circuit components, software or firmware, or alternatively be implemented separately.

In the illustrated embodiment, communication functions of the communication interface 912 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 912, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 900 shown in FIG. 9.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 10:
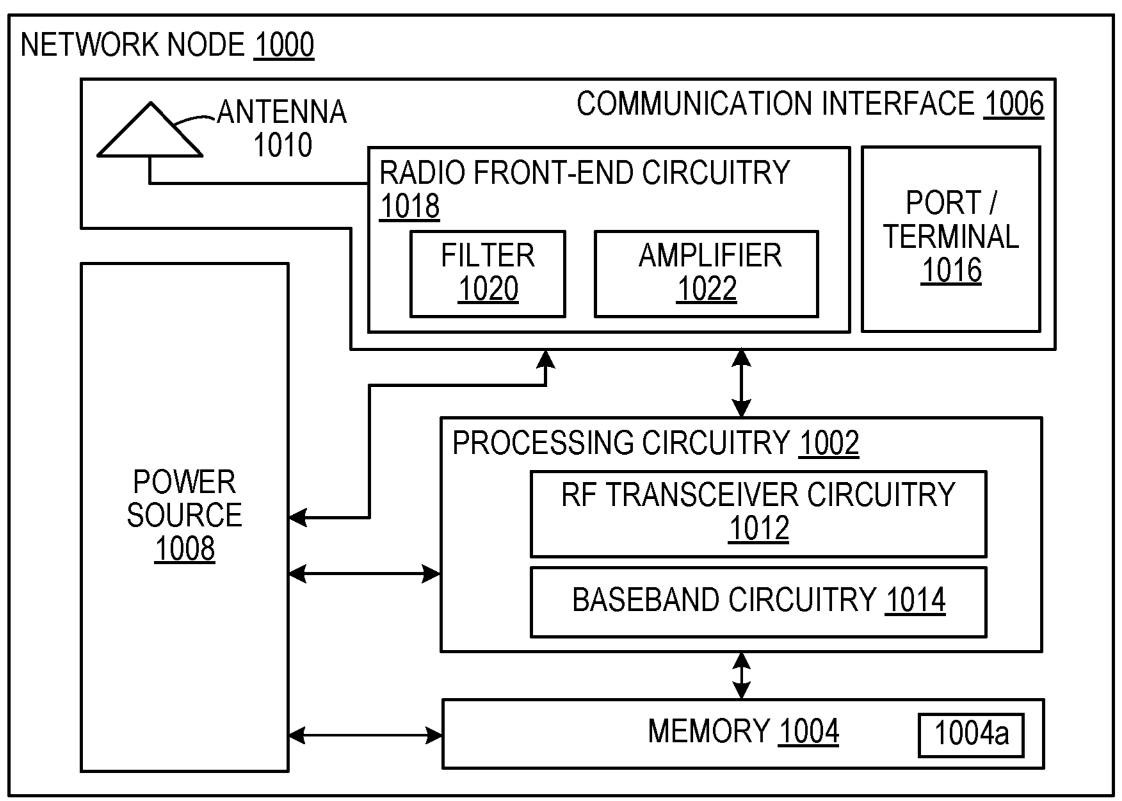
FIG. 10 shows a network node according to various embodiments of the present disclosure.

FIG. 10 shows a network node 1000 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1000 includes a processing circuitry 1002, a memory 1004, a communication interface 1006, and a power source 1008. The network node 1000 may be composed of multiple physically separate components (e.g., a NodeB component and a RNC component, or a BTS component and a BSC component, etc.), which may each have their own respective components. In certain scenarios in which the network node 1000 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1000 may be configured to support multiple radio access technologies (RATs). In such embodiments, some components may be duplicated (e.g., separate memory 1004 for different RATs) and some components may be reused (e.g., a same antenna 1010 may be shared by different RATs). The network node 1000 may also include multiple sets of the various illustrated components for different wireless technologies integrated into network node 1000, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1000.

The processing circuitry 1002 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1000 components, such as the memory 1004, to provide network node 1000 functionality.

In some embodiments, the processing circuitry 1002 includes a system on a chip (SOC). In some embodiments, the processing circuitry 1002 includes one or more of radio frequency (RF) transceiver circuitry 1012 and baseband processing circuitry 1014. In some embodiments, the radio frequency (RF) transceiver circuitry 1012 and the baseband processing circuitry 1014 may be on separate chips (or sets of chips), boards, or units, such as radio units and digital units. In alternative embodiments, part or all of RF transceiver circuitry 1012 and baseband processing circuitry 1014 may be on the same chip or set of chips, boards, or units.

The memory 1004 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1002. The memory 1004 may store any suitable instructions, data, or information, including a computer program, software, an application including one or more of logic, rules, code, tables, and/or other instructions (referred to collectively as computer program product 1004*a*) capable of being executed by the processing circuitry 1002 and utilized by the network node 1000. The memory 1004 may be used to store any calculations made by the processing circuitry 1002 and/or any data received via the communication interface 1006. In some embodiments, the processing circuitry 1002 and memory 1004 is integrated.

The communication interface 1006 is used in wired or wireless communication of signaling and/or data between a network node, access network, and/or UE. As illustrated, the communication interface 1006 comprises port(s)/terminal(s) 1016 to send and receive data, for example to and from a network over a wired connection. The communication interface 1006 also includes radio front-end circuitry 1018 that may be coupled to, or in certain embodiments a part of, the antenna 1010. Radio front-end circuitry 1018 comprises filters 1020 and amplifiers 1022. The radio front-end circuitry 1018 may be connected to an antenna 1010 and processing circuitry 1002. The radio front-end circuitry may be configured to condition signals communicated between antenna 1010 and processing circuitry 1002. The radio front-end circuitry 1018 may receive digital data that is to be sent out to other network nodes or UEs via a wireless connection. The radio front-end circuitry 1018 may convert the digital data into a radio signal having the appropriate channel and bandwidth parameters using a combination of filters 1020 and/or amplifiers 1022. The radio signal may then be transmitted via the antenna 1010. Similarly, when receiving data, the antenna 1010 may collect radio signals which are then converted into digital data by the radio front-end circuitry 1018. The digital data may be passed to the processing circuitry 1002. In other embodiments, the communication interface may comprise different components and/or different combinations of components.

In certain alternative embodiments, the network node 1000 does not include separate radio front-end circuitry 1018, instead, the processing circuitry 1002 includes radio front-end circuitry and is connected to the antenna 1010. Similarly, in some embodiments, all or some of the RF transceiver circuitry 1012 is part of the communication interface 1006. In still other embodiments, the communication interface 1006 includes one or more ports or terminals 1016, the radio front-end circuitry 1018, and the RF transceiver circuitry 1012, as part of a radio unit (not shown), and the communication interface 1006 communicates with the baseband processing circuitry 1014, which is part of a digital unit (not shown).

The antenna 1010 may include one or more antennas, or antenna arrays, configured to send and/or receive wireless signals. The antenna 1010 may be coupled to the radio front-end circuitry 1018 and may be any type of antenna capable of transmitting and receiving data and/or signals wirelessly. In certain embodiments, the antenna 1010 is separate from the network node 1000 and connectable to the network node 1000 through an interface or port.

The antenna 1010, communication interface 1006, and/or the processing circuitry 1002 may be configured to perform any receiving operations and/or certain obtaining operations described herein as being performed by the network node. Any information, data and/or signals may be received from a UE, another network node and/or any other network equipment. Similarly, the antenna 1010, the communication interface 1006, and/or the processing circuitry 1002 may be configured to perform any transmitting operations described herein as being performed by the network node. Any information, data and/or signals may be transmitted to a UE, another network node and/or any other network equipment.

The power source 1008 provides power to the various components of network node 1000 in a form suitable for the respective components (e.g., at a voltage and current level needed for each respective component). The power source 1008 may further comprise, or be coupled to, power management circuitry to supply the components of the network node 1000 with power for performing the functionality described herein. For example, the network node 1000 may be connectable to an external power source (e.g., the power grid, an electricity outlet) via an input circuitry or interface such as an electrical cable, whereby the external power source supplies power to power circuitry of the power source 1008. As a further example, the power source 1008 may comprise a source of power in the form of a battery or battery pack which is connected to, or integrated in, power circuitry. The battery may provide backup power should the external power source fail.

Embodiments of the network node 1000 may include additional components beyond those shown in FIG. 10 for providing certain aspects of the network node's functionality, including any of the functionality described herein and/or any functionality necessary to support the subject matter described herein. For example, the network node 1000 may include user interface equipment to allow input of information into the network node 1000 and to allow output of information from the network node 1000. This may allow a user to perform diagnostic, maintenance, repair, and other administrative functions for the network node 1000.

Figure 11:
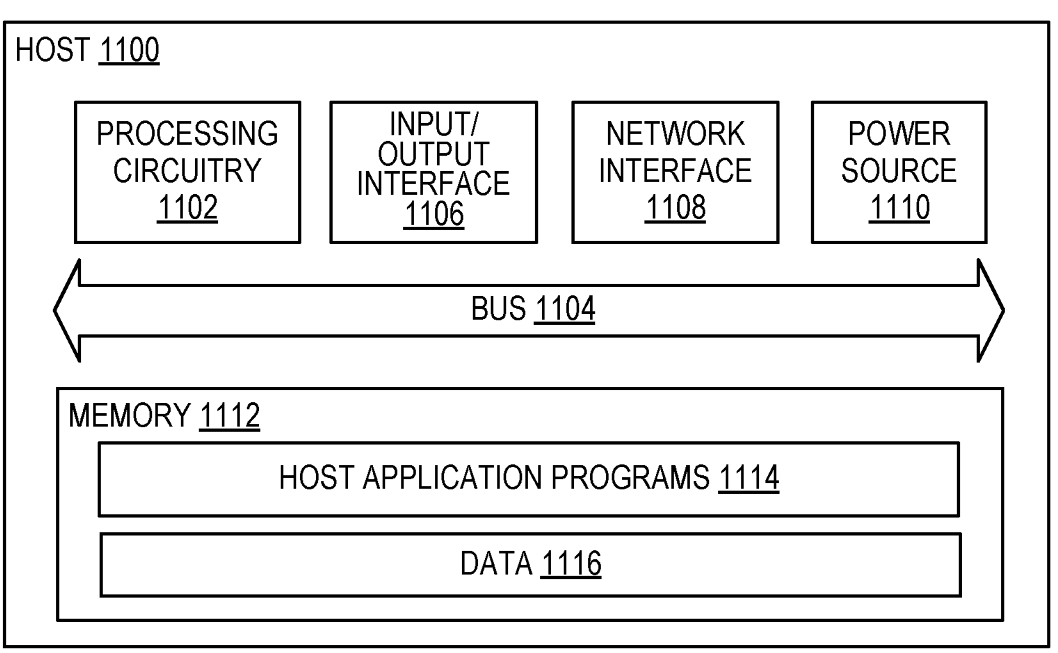
FIG. 11 shows host computing system according to various embodiments of the present disclosure.

FIG. 11 is a block diagram of a host 1100, which may be an embodiment of the host 816 of FIG. 8, in accordance with various aspects described herein. As used herein, the host 1100 may be or comprise various combinations hardware and/or software, including a standalone server, a blade server, a cloud-implemented server, a distributed server, a virtual machine, container, or processing resources in a server farm. The host 1100 may provide one or more services to one or more UEs.

The host 1100 includes processing circuitry 1102 that is operatively coupled via a bus 1104 to an input/output interface 1106, a network interface 1108, a power source 1110, and a memory 1112. Other components may be included in other embodiments. Features of these components may be substantially similar to those described with respect to the devices of previous figures, such as FIGS. 9 and 10, such that the descriptions thereof are generally applicable to the corresponding components of host 1100.

The memory 1112 may include one or more computer programs including one or more host application programs 1114 and data 1116, which may include user data, e.g., data generated by a UE for the host 1100 or data generated by the host 1100 for a UE. Embodiments of the host 1100 may utilize only a subset or all of the components shown. The host application programs 1114 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1114 may also provide for user authentication and licensing checks and may periodically report health, routes, and content availability to a central node, such as a device in or on the edge of a core network. Accordingly, the host 1100 may select and/or indicate a different host for over-the-top services for a UE. The host application programs 1114 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 12:
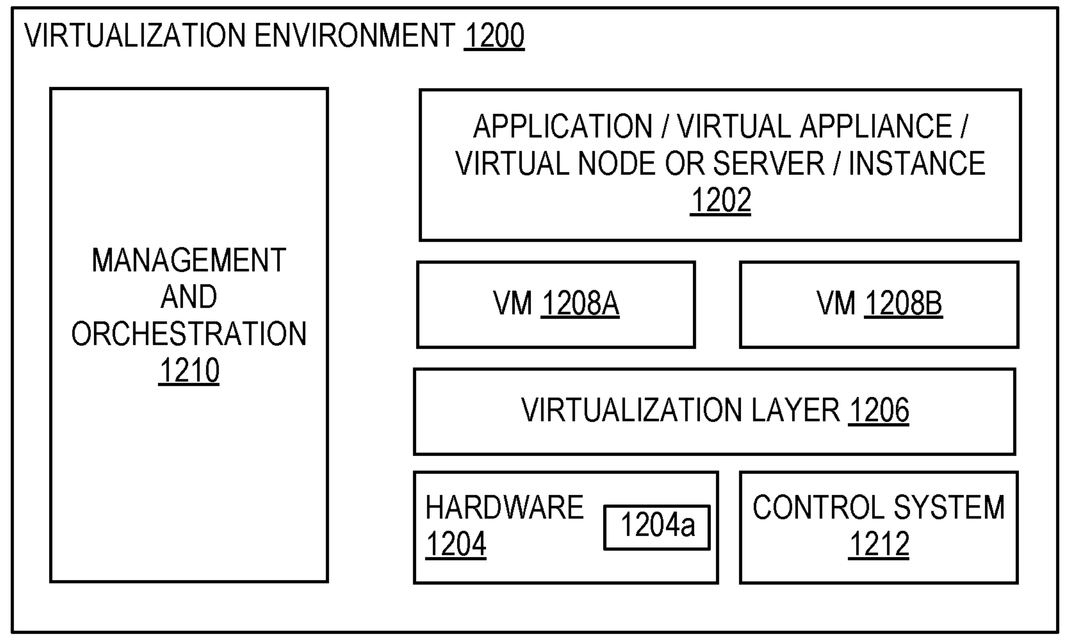
FIG. 12 is a block diagram of a virtualization environment in functions implemented by some embodiments of the present disclosure may be virtualized.

FIG. 12 is a block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1200 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1202 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1204 includes processing circuitry, memory that stores software and/or instructions (referred to collectively as computer program product 1204*a*) executable by hardware processing circuitry, and/or other hardware devices as described herein, such as a network interface, input/output interface, and so forth. Software may be executed by the processing circuitry to instantiate one or more virtualization layers 1206 (also referred to as hypervisors or virtual machine monitors (VMMs)), provide VMs 1208*a* and 1208*b* (one or more of which may be generally referred to as VMs 1208), and/or perform any of the functions, features and/or benefits described in relation with some embodiments described herein. The virtualization layer 1206 may present a virtual operating platform that appears like networking hardware to the VMs 1208.

The VMs 1208 comprise virtual processing, virtual memory, virtual networking or interface and virtual storage, and may be run by a corresponding virtualization layer 1206. Different embodiments of the instance of a virtual appliance 1202 may be implemented on one or more of VMs 1208, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1208 may be a software implementation of a physical machine that runs programs as if they were executing on a physical, non-virtualized machine. Each of the VMs 1208, and that part of hardware 1204 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1208 on top of the hardware 1204 and corresponds to the application 1202.

Hardware 1204 may be implemented in a standalone network node with generic or specific components. Hardware 1204 may implement some functions via virtualization. Alternatively, hardware 1204 may be part of a larger cluster of hardware (e.g., such as in a data center or CPE) where many hardware nodes work together and are managed via management and orchestration 1210, which, among others, oversees lifecycle management of applications 1202. In some embodiments, hardware 1204 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1212 which may alternatively be used for communication between hardware nodes and radio units.

Figure 13:
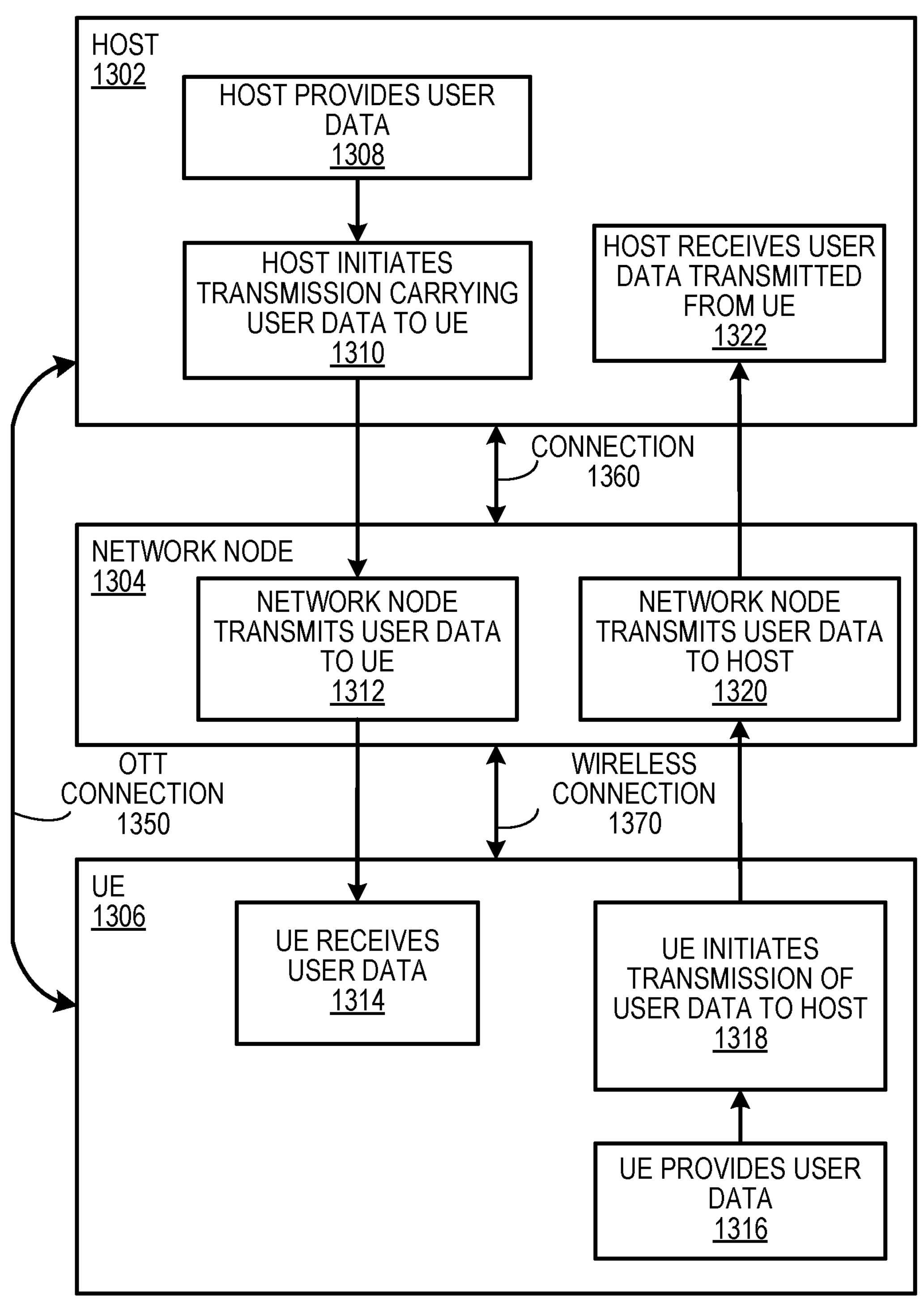
FIG. 13 illustrates communication between a host computing system, a network node, and a UE via multiple connections, at least one of which is wireless, according to various embodiments of the present disclosure.

FIG. 13 shows a communication diagram of a host 1302 communicating via a network node 1304 with a UE 1306 over a partially wireless connection in accordance with some embodiments. Example implementations, in accordance with various embodiments, of the UE (such as a UE 812*a* of FIG. 8 and/or UE 900 of FIG. 9), network node (such as network node 810*a* of FIG. 8 and/or network node 1000 of FIG. 10), and host (such as host 816 of FIG. 8 and/or host 1100 of FIG. 11) discussed in the preceding paragraphs will now be described with reference to FIG. 13.

Like host 1100, embodiments of host 1302 include hardware, such as a communication interface, processing circuitry, and memory. The host 1302 also includes software, which is stored in or accessible by the host 1302 and executable by the processing circuitry. The software includes a host application that may be operable to provide a service to a remote user, such as the UE 1306 connecting via an over-the-top (OTT) connection 1350 extending between the UE 1306 and host 1302. In providing the service to the remote user, a host application may provide user data which is transmitted using the OTT connection 1350.

The network node 1304 includes hardware enabling it to communicate with the host 1302 and UE 1306. The connection 1360 may be direct or pass through a core network (like core network 806 of FIG. 8) and/or one or more other intermediate networks, such as one or more public, private, or hosted networks. For example, an intermediate network may be a backbone network or the Internet.

The UE 1306 includes hardware and software, which is stored in or accessible by UE 1306 and executable by the UE's processing circuitry. The software includes a client application, such as a web browser or operator-specific "app" that may be operable to provide a service to a human or non-human user via UE 1306 with the support of the host 1302. In the host 1302, an executing host application may communicate with the executing client application via the OTT connection 1350 terminating at the UE 1306 and host 1302. In providing the service to the user, the UE's client application may receive request data from the host's host application and provide user data in response to the request data. The OTT connection 1350 may transfer both the request data and the user data. The UE's client application may interact with the user to generate the user data that it provides to the host application through the OTT connection 1350.

The OTT connection 1350 may extend via a connection 1360 between the host 1302 and the network node 1304 and via a wireless connection 1370 between the network node 1304 and the UE 1306 to provide the connection between the host 1302 and the UE 1306. The connection 1360 and wireless connection 1370, over which the OTT connection 1350 may be provided, have been drawn abstractly to illustrate the communication between the host 1302 and the UE 1306 via the network node 1304, without explicit reference to any intermediary devices and the precise routing of messages via these devices.

As an example of transmitting data via the OTT connection 1350, in step 1308, the host 1302 provides user data, which may be performed by executing a host application. In some embodiments, the user data is associated with a particular human user interacting with the UE 1306. In other embodiments, the user data is associated with a UE 1306 that shares data with the host 1302 without explicit human interaction. In step 1310, the host 1302 initiates a transmission carrying the user data towards the UE 1306. The host 1302 may initiate the transmission 15 responsive to a request transmitted by the UE 1306. The request may be caused by human interaction with the UE 1306 or by operation of the client application executing on the UE 1306. The transmission may pass via the network node 1304, in accordance with the teachings of the embodiments described throughout this disclosure. Accordingly, in step 1312, the network node 1304 transmits to the UE 1306 the user data that was carried in the transmission that the host 1302 initiated, in accordance with the teachings of the embodiments described throughout this disclosure. In step 1314, the UE 1306 receives the user data carried in the transmission, which may be performed by a client application executed on the UE 1306 associated with the host application executed by the host 1302.

In some examples, the UE 1306 executes a client application which provides user data to the host 1302. The user data may be provided in reaction or response to the data received from the host 1302. Accordingly, in step 1316, the UE 1306 may provide user data, which may be performed by executing the client application. In providing the user data, the client application may further consider user input received from the user via an input/output interface of the UE 1306. Regardless of the specific manner in which the user data was provided, the UE 1306 initiates, in step 1318, transmission of the user data towards the host 1302 via the network node 1304. In step 1320, in accordance with the teachings of the embodiments described throughout this disclosure, the network node 1304 receives user data from the UE 1306 and initiates transmission of the received user data towards the host 1302. In step 1322, the host 1302 receives the user data carried in the transmission initiated by the UE 1306.

One or more of the various embodiments improve the performance of OTT services provided to the UE 1306 using the OTT connection 1350, in which the wireless connection 1370 forms the last segment. More precisely, these embodiments can provide a consistent handling of UEs after an inter-system handover from 5GS to EPS, even after RLF and subsequent connection reestablishment. This leads to improved UE inter-system mobility and, consequently, more consistent delivery of OTT services to UEs via the network as well as improved end-user experience. This increases the value of OTT services to both end-users and service providers.

In an example scenario, factory status information may be collected and analyzed by the host 1302. As another example, the host 1302 may process audio and video data which may have been retrieved from a UE for use in creating maps. As another example, the host 1302 may collect and analyze real-time data to assist in controlling vehicle congestion (e.g., controlling traffic lights). As another example, the host 1302 may store surveillance video uploaded by a UE. As another example, the host 1302 may store or control access to media content such as video, audio, VR or AR which it can broadcast, multicast or unicast to UEs. As other examples, the host 1302 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1350 between the host 1302 and UE 1306, in response to variations in the measurement results. The measurement procedure and/or the network functionality for reconfiguring the OTT connection may be implemented in software and hardware of the host 1302 and/or UE 1306. In some embodiments, sensors (not shown) may be deployed in or in association with other devices through which the OTT connection 1350 passes; the sensors may participate in the measurement procedure by supplying values of the monitored quantities exemplified above or supplying values of other physical quantities from which software may compute or estimate the monitored quantities. The reconfiguring of the OTT connection 1350 may include message format, retransmission settings, preferred routing etc.; the reconfiguring need not directly alter the operation of the network node 1304. Such procedures and functionalities may be known and practiced in the art. In certain embodiments, measurements may involve proprietary UE signaling that facilitates measurements of throughput, propagation times, latency and the like, by the host 1302. The measurements may be implemented in that software causes messages to be transmitted, in particular empty or 'dummy' messages, using the OTT connection 1350 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a first network node of a wireless network, the method comprising:

sending, to a second network node of the wireless network, a request to retrieve context information associated with a user equipment (UE) that has been or is being handed over from the second network node to the first network node; and receiving the context information associated with the UE from the second network node, wherein the context information includes an indication of whether the UE has an active IP Multimedia System (IMS) voice call that was subject to a first inter-system handover from a 5G System (5GS) to the wireless network.

A2. The method of embodiment A1, further comprising based on the received context information, establishing a connection with the UE to carry the active IMS voice call.

A3. The method of any of embodiments A1-A2, wherein the received context information also indicates a radio access bearer (RAB) used for the active IMS voice call.

A4. The method of any of embodiments A1-A3, further comprising:

responsive to the end of the active IMS voice call, determining whether the 5GS is available; and based on determining that the 5GS is available, performing a second inter-system handover of the UE from the wireless network to the 5GS.

A5. The method of any of embodiments A1-A4, wherein:

the wireless network is an Evolved Packet System (EPS) and the first and second network nodes are evolved NodeBs (eNBs); and the indication indicates an IMS voice fallback from 5GS to EPS.

B1. A method for a second network node of a wireless network, the method comprising:

receiving, from a first network node of the wireless network, a request to retrieve context information associated with a user equipment (UE) that has been or is being handed over from the second network node to the first network node; and sending the context information associated with the UE to the first network node, wherein the context information includes an indication of whether the UE has an active IP Multimedia System (IMS) voice call that was subject to a first inter-system handover from a 5G System (5GS) to the wireless network.

B2. The method of embodiment B1, further comprising:

performing the first inter-system handover of the UE from a network node of the 5GS; and setting the indication included in the context information according to whether the UE has an active IMS voice call during the first inter-system handover.

B3. The method of any of embodiments B1-B2, wherein the context information also indicates a radio access bearer (RAB) used for the active IMS voice call.

B4. The method of any of embodiments B1-B3, wherein:

the wireless network is an Evolved Packet System (EPS) and the first and second network nodes are evolved NodeBs (eNBs); and the indication indicates an IMS voice fallback from 5GS to EPS.

C1. A first network node configured for operation in a wireless network, the first network node comprising:

a communication interface configured to communicate with a user equipment (UE) and with a second network node of the wireless network; and processing circuitry operatively coupled to the communication interface, whereby the processing circuitry and the communication interface are configured to perform operations corresponding to any of the methods of embodiments A1-A5.

C2. A first network node configured for operation in a wireless network, the first network node being further configured to perform operations corresponding to any of the methods of embodiments A1-A5.

C3. A non-transitory, computer-readable medium storing computer-executable instructions that, when executed by processing circuitry of a first network node configured for operation in a wireless network, configure the first network node to perform operations corresponding to any of the methods of embodiments A1-A5.

C4. A computer program product comprising computer-executable instructions that, when executed by processing circuitry of a first network node configured for operation in a wireless network, configure the first network node to perform operations corresponding to any of the methods of embodiments A1-A5.

D1. A second network node configured for operation in a wireless network, the second network node comprising:

a communication interface configured to communicate with a user equipment (UE) and with a first network node of the wireless network; and processing circuitry operatively coupled to the communication interface, whereby the processing circuitry and the communication interface are configured to perform operations corresponding to any of the methods of embodiments B1-B4.

D2. A second network node configured for operation in a wireless network, the second network node being further configured to perform operations corresponding to any of the methods of embodiments B1-B4.

D3. A non-transitory, computer-readable medium storing computer-executable instructions that, when executed by processing circuitry of a second network node configured for operation in a wireless network, configure the second network node to perform operations corresponding to any of the methods of embodiments B1-B4.

D4. A computer program product comprising computer-executable instructions that, when executed by processing circuitry of a second network node configured for operation in a wireless network, configure the second network node to perform operations corresponding to any of the methods of embodiments B1-B4.

The invention claimed is:

1. A method performed by a first network node of a wireless network for connection re-establishment of a user equipment (UE), the method comprising:

sending, to a second network node of the wireless network, a request to retrieve context information associated with the UE, wherein:

the UE's connection has been or is being reestablished with the first network node following the UEs radio link failure (RLF) towards the second network node, the wireless network is an Evolved Packet System (EPS), and the first and second network nodes are evolved NodeBs (eNBs); and receiving the context information associated with the UE from the second network node, wherein the context information includes an indication that the UE was handed over from a 5G system (5GS) to the EPS due to an IP Multimedia System (IMS) voice fallback from the 5GS to the EPS via a first inter-system handover.

2. The method of claim 1, further comprising based on the received context information, establishing a connection with the UE to carry an active IMS voice call.

3. The method of claim 1, wherein the received context information also indicates a radio access bearer (RAB) used for an active IMS voice call.

4. The method of claim 1, further comprising storing the received context information including the indication and performing one or more actions towards the UE based on the stored indication.

5. The method of claim 4, wherein performing the one or more actions comprises:

when the indication indicates that the UE has an active IMS voice call that was subject to the first inter-system handover from the 5GS, determining whether the 5GS is available; and based on determining that the 5GS is available, performing a second inter-system handover of the UE from the wireless network to the 5GS.

6. The method of claim 5, wherein:

performing the one or more actions further comprises, when the indication indicates that the UE has an active IMS voice call that was subject to the first inter-system handover from the 5GS, detecting one of the following conditions: end of the active IMS voice call, or a reduced quality of service (QoS) for the active IMS voice call; and determining whether the 5GS is available is responsive to detecting one of the conditions.

7. The method of claim 1, wherein:

the request comprises a RETRIEVE UE CONTEXT REQUEST message; and the context information is received in a UE Context Information information element of a RETRIEVE UE CONTEXT RESPONSE message.

8. A non-transitory, computer-readable medium storing computer-executable instructions that, when executed by processing circuitry of a first network node configured for operation in a wireless network, configure the first network node to perform operations corresponding to the method of claim 1.

9. A method performed by a second network node of a wireless network for connection re-establishment of a user equipment (UE), the method comprising:

receiving, from a first network node of the wireless network, a request to retrieve context information associated with the UE, wherein:

the UE's connection has been or is being reestablished with the first network node following the UEs radio link failure (RLF) towards the second network node, the wireless network is an Evolved Packet System (EPS), and the first and second network nodes are evolved NodeBs (eNBs); and sending the context information associated with the UE to the first network node, wherein the context information includes an indication that the UE was handed over from a 5G system (5GS) to the EPS due to an IP Multimedia System (IMS) voice fallback from the 5GS to the EPS via a first inter-system handover.

10. The method of claim 9, further comprising:

performing the first inter-system handover of the UE from a network node of the 5GS; and setting the indication included in the context information according to whether the UE has an active IMS voice call during the first inter-system handover.

11. The method of claim 9, wherein the context information also indicates a radio access bearer (RAB) used for an active IMS voice call.

12. The method of claim 9, wherein:

the request comprises a RETRIEVE UE CONTEXT REQUEST message; and the context information is sent in a UE Context Information information element of a RETRIEVE UE CONTEXT RESPONSE message.

13. A non-transitory, computer-readable medium storing computer-executable instructions that, when executed by processing circuitry of a second network node configured for operation in a wireless network, configure the second network node to perform operations corresponding to the method of claim 9.

14. A first network node configured for connection re-establishment of a user equipment (UE) in a wireless network, the first network node comprising:

communication interface circuitry configured to communicate with the UE and with a second network node of the wireless network; and processing circuitry operatively coupled to the communication interface circuitry, wherein the processing circuitry and the communication interface circuitry are configured to:

send, to the second network node, a request to retrieve context information associated with the UE, wherein:

the UE's connection has been or is being reestablished with the first network node following the UEs radio link failure (RLF) towards the second network node, the wireless network is an Evolved Packet System (EPS), and the first and second network nodes are evolved NodeBs (eNBs); and receive the context information associated with the UE from the second network node, wherein the context information includes an indication that the UE was handed over from a 5G system (5GS) to the EPS due to an IP Multimedia System (IMS) voice fallback from the 5GS to the EPS via a first inter-system handover.

15. The first network node of claim 14, wherein the processing circuitry and the communication interface circuitry are further configured to, based on the received context information, establish a connection with the UE to carry an active IMS voice call.

16. The first network node of claim 14, wherein the received context information also indicates a radio access bearer (RAB) used for an active IMS voice call.

17. The first network node of claim 14, wherein the processing circuitry and the communication interface circuitry are further configured to:

store the received context information including the indication, and perform one or more actions towards the UE based on the stored indication, including the following:

when the indication indicates that the UE has an active IMS voice call that was subject to the first inter-system handover from the 5GS, determine whether the 5GS is available; and based on a determination that the 5GS is available, perform a second inter-system handover of the UE from the wireless network to the 5GS.

18. The first network node of claim 17, wherein:

the one or more actions performed also include, when the indication indicates that the UE has an active IMS voice call that was subject to the first inter-system handover from the 5GS, detect one of the following conditions: end of the active IMS voice call, or a reduced quality of service (QoS) for the active IMS voice call; and the processing circuitry and the communication interface circuitry are configured to determine whether the 5GS is available in response to the detection of one of the conditions.

19. The method of claim 14, wherein:

the request comprises a RETRIEVE UE CONTEXT REQUEST message; and the context information is received in a UE Context Information information element of a RETRIEVE UE CONTEXT RESPONSE message.

20. A second network node configured for connection re-establishment of a user equipment (UE) in a wireless network, the second network node comprising:

communication interface circuitry configured to communicate with the UE and with a first network node of the wireless network; and processing circuitry operatively coupled to the communication interface circuitry, wherein the processing circuitry and the communication interface circuitry are configured to:

receive, from the first network node, a request to retrieve context information associated with the UE, wherein:

the UE's connection has been or is being reestablished with the first network node following the UEs radio link failure (RLF) towards the second network node, the wireless network is an Evolved Packet System (EPS), and the first and second network nodes are evolved NodeBs (eNBs); and send the context information associated with the UE to the first network node, wherein the context information includes an indication that the UE was handed over from a 5G system (5GS) to the EPS due to an IP Multimedia System (IMS) voice fallback from the 5GS to the EPS via a first inter-system handover.

* * * * *